(12) United States Patent
Smith et al.

(10) Patent No.: US 7,500,158 B1
(45) Date of Patent: Mar. 3, 2009

(54) SYSTEM AND METHOD FOR NETWORK DEVICE CONFIGURATION

(75) Inventors: John Kei Smith, Honolulu, HI (US);
Leslie Lauren W. Y. Yuen, Honolulu, HI (US); Christopher M. Gouveia, Honolulu, HI (US)

(73) Assignee: Referentia Systems, Inc., Honolulu, HI (US)

( * ) Notice: Subject to any disclaimer, the term of this patent is extended or adjusted under 35 U.S.C. 154(b) by 270 days.

(21) Appl. No.: 11/483,054

(22) Filed: Jul. 6, 2006

(51) Int. Cl.
*G06F 11/00* (2006.01)
(52) U.S. Cl. ...................... 714/708; 709/220
(58) Field of Classification Search ............... 709/223, 709/224, 220; 712/36; 455/423, 414.1; 717/174; 714/708
See application file for complete search history.

(56) References Cited

U.S. PATENT DOCUMENTS

| | | | | |
|---|---|---|---|---|
| 6,330,597 | B2 * | 12/2001 | Collin et al. | 709/220 |
| 6,842,844 | B1 * | 1/2005 | Fadavi-Ardekani et al. | 712/36 |
| 2003/0126248 | A1 * | 7/2003 | Chambers | 709/223 |
| 2006/0217115 | A1 * | 9/2006 | Cassett et al. | 455/423 |
| 2007/0169107 | A1 * | 7/2007 | Huttunen | 717/174 |
| 2007/0202859 | A1 * | 8/2007 | Ward | 455/414.1 |

OTHER PUBLICATIONS

"AutoQos—VoIP," Copyright 2005, Cisco Systems, Inc.
"AutoQos for the Enterprise," Copyright 2004, Cisco Systems, Inc.
"Cisco Configuration Assurance Solution Virtual Network Data Server VNE Server User Guide," Software Release 3.0, Copyright 2005, Cisco Systems, Inc.
"User Guide for Internetwork Performance Monitor," Software 2.6, CiscoWorks, Copyright 1998-2005, Cisco Systems, Inc.
"About Cisco IOS Software Documentation for Release 12.4," Copyright 2005, Cisco Systems, Inc.

* cited by examiner

*Primary Examiner*—David Ton
(74) *Attorney, Agent, or Firm*—Martine Penilla & Gencarella, LLP

(57) ABSTRACT

Methods and systems for identifying configuration parameters for a network device are provided. The method includes generating a stream of traffic data, where the traffic data has a known characteristic. Then, applying the stream of traffic data to the network device, where the network device has a specific type, and the network device generates an output based on the traffic data. The method then includes monitoring performance of the network device while the traffic data is processed by the network device, and the monitoring is configured to generate monitoring data for the traffic data applied to the network device having the specific type. Also, the method includes analyzing the output from the network device, where the analyzing is performed to identify how the traffic data was handled by the network device, and the analyzing is configured to generate performance metrics. The method further includes saving the monitoring data and the performance metrics to a knowledge database. The knowledge database is capable of being accessed to enable configuration of other network devices based in part on the monitoring data and performance metrics.

27 Claims, 14 Drawing Sheets

| Test Case | Router | Time | | | Test Generator | | | Router Configuration | | | | Router Monitoring | | | | Test Analyzer | | |
|---|---|---|---|---|---|---|---|---|---|---|---|---|---|---|---|---|---|---|
| | | | | Type | Rate | Length | Queue | Bandwidth Guarantee | Policer Bandwidth | CPU | Memory | Pre Policy Rate | Post Policy Rate | Jitter (ns) | Rate | Latency |
| Case 1 | Cisco 871 | Time 0 | Overall | | | | | | | | 23% | 7% | | | | | |
| | | | Class A | UDP-RTP | 125Kbps | Fixed-300 bytes | Priority | 100Kbps | 110Kbps | | | 125 | 110 | 100 | 125 | 8ms |
| | | | Class B | TCP-Telnet | 150Kbps | Fixed-500 bytes | Class based | 200Kbps | 210Kbps | | | 150 | 150 | 250 | 150 | 10ms |
| | | | Class C | TCP-HTTP | 175Kbps | Fixed-1000 bytes | Class based | 300Kbps | 310Kbps | | | 175 | 175 | 250 | 175 | 10ms |
| | | Time 1 | | | | | | | | 28% | 7% | | | | | |
| | | | Class A | UDP-RTP | 200Kbps | Fixed-300 bytes | Priority | 100Kbps | 110Kbps | | | 200 | 110 | 100 | 110 | 8ms |
| | | | Class B | TCP-Telnet | 250Kbps | Fixed-500 bytes | Class based | 200Kbps | 210Kbps | | | 250 | 210 | 250 | 210 | 10ms |
| | | | Class C | TCP-HTTP | 300Kbps | Fixed-1000 bytes | Class based | 300Kbps | 310Kbps | | | 300 | 300 | 250 | 300 | 10ms |
| | | | Class D | UDP-SNMP | 350Kbps | Gaussian-2500 bytes | Class based | 400Kbps | 410Kbps | | | 350 | 350 | 250 | 350 | 12ms |
| | | Time 2 | | | | | | | | 33% | 7% | | | | | |
| | | | Class A | UDP-RTP | 250Kbps | Fixed-300 bytes | Priority | 100Kbps | 110Kbps | | | 250 | 110 | 100 | 110 | 8ms |
| | | | Class B | TCP-Telnet | 300Kbps | Fixed-500 bytes | Class based | 200Kbps | 210Kbps | | | 300 | 210 | 250 | 210 | 10ms |
| | | | Class C | TCP-HTTP | 350Kbps | Fixed-1000 bytes | Class based | 300Kbps | 310Kbps | | | 350 | 310 | 250 | 310 | 10ms |
| | | | Class D | UDP-SNMP | 400Kbps | Gaussian-2500 bytes | Class based | 400Kbps | 410Kbps | | | 400 | 400 | 250 | 400 | 15ms |
| | | | Class E | TCP-HTTPS | 450Kbps | Ramp-1000 to 2000 bytes | Class based | 500Kbps | 510Kbps | | | 450 | 450 | 250 | 450 | 15ms |
| | | | Class F | TCP-FTP | 500Kbps | Ramp-1500 to 2500 bytes | Class based | 600Kbps | 610Kbps | | | 500 | 500 | 250 | 500 | 15ms |

Fig. 3

| Input | | System | | Network Device Statistics Class Based Queue Stats | | | | Output | | | | | | | |
|---|---|---|---|---|---|---|---|---|---|---|---|---|---|---|---|
| Test Number | Test Setup # in Test Table (Fig. 4B) | Flow # in Flow Table (Fig. 4D) | CPU Usage | Memory Usage | Pre Queue Rate | Post Queue Rate | Queue Depth | Packet Drops | Output Rate | Jitter Max | Jitter Min | Latency Min | Latency Max | Bit Error | Drop | Reorder |
| 1 | 1 | 1 | 12% | 3% | 60 | 60 | 0 | 0 | 60 | 3 ms | 1 ms | 35 ms | 35 ms | 0 | 0% | 0% |
| 2 | 1 | 2 | 12% | 3% | 70 | 70 | 0 | 0 | 70 | 2 ms | 2 ms | 36 ms | 36 ms | 0 | 0% | 0% |
| 3 | 1 | 3 | 12% | 3% | 80 | 72 | 3 | 8 | 80 | 1 ms | 3 ms | 37 ms | 37 ms | 0 | 3% | 0% |
| 4 | 1 | 4 | 15% | 3% | 90 | 72 | 4 | 18 | 90 | 0 ms | 4 ms | 38 ms | 38 ms | 1 | 3% | 0% |
| 5 | 2 | 1 | 12% | 3% | 80 | 72 | 4 | 8 | 80 | 1 ms | 5 ms | 39 ms | 39 ms | 0 | 3% | 0% |
| 6 | 2 | 2 | 12% | 3% | 70 | 70 | 0 | 0 | 70 | 2 ms | 6 ms | 40 ms | 40 ms | 0 | 0% | 0% |
| 7 | 2 | 3 | 12% | 3% | 60 | 60 | 0 | 0 | 60 | 3 ms | 7 ms | 41 ms | 41 ms | 0 | 0% | 0% |

Fig. 4A

| Test Table |||
| --- | --- | --- |
| Test Setup Number | Router # in Router Table (Fig. 4C) | Test On Interface |
| 1 | 1 | FA0 |
| 2 | 1 | FA1 |
| 3 | 2 | FA1 |

Fig. 4B

| Router Table ||||||
| --- | --- | --- | --- | --- | --- |
| Router Number | Router | IOS | HW | Memory installed | Policy Name |
| 1 | 871 | 12.3 T | HWIC | 256 MB | test_policy1 (Fig. 4E) |
| 2 | 2811 | 12.4 | HWC | 512 MB | test_policy1 (Fig. 4E) |

Fig. 4C

| Flow Table |||||||
| --- | --- | --- | --- | --- | --- | --- |
| Flow Number | Packet Type | Length | Distribution | Source Port | Destination Port | Rate | Characteristics |
| 1 | UDP | 200 | Fixed | 45 | 4555 | 1000 | Periodic |
| 2 | TCP | 500 | Fixed | 80 | 5000 | 1000 | Periodic |
| 3 | UDP | 1000 | Fixed | 1223 | 356 | 1000 | Periodic |
| 4 | TCP | 2000 | Quad | 2222 | 355 | 1000 | Periodic |
| 5 | TCP | 5000 | Quad | 2345 | 355 | 1000 | Bursty |

Fig. 4D

| test_policy1 |||
|---|---|---|
| Class ID | Class Type | Class Description |
| A | Voice | Priority, 25% Bandwidth |
| B | Transactional | 25% Bandwidth |
| C | Bulk | 10% Bandwidth, Policing Plan A |
| D | Scavenger | 3% Bandwidth, Policing Plan B |
| E | Business Critical | 10% Bandwidth |
| F | Default | 25% Bandwidth |

Fig. 4E

| Number | Router | | | Forwarding Limits | | CPU Usage Base on Input Rate | | | Output Behavior | | | | |
|---|---|---|---|---|---|---|---|---|---|---|---|---|---|
| | Model | IOS | Interface | Input | CPU | 25% | 50% | 75% | Input (Kbps) | Queue Depth | Queue Type | Jitter | Latency |
| 1 | 871 | 12.3.1 | FE | 40 Mbps | 80% | 10 Mbps | 20 Mpbs | 30 Mbps | 250 | 0 | Priority | 100ns | 8 ms |
| | | | | | | | | | 300 | 0 | Priority | 100ns | 10ms |
| | | | | | | | | | 350 | 2 | Priority | 100ns | 10ms |
| | | | | | | | | | 400 | 3 | Priority | 100ns | 10ms |
| | | | | | | | | | 300 | 5 | Class | 250 ns | 10ms |
| | | | | | | | | | 350 | 5 | Class | 250ns | 10ms |
| | | | | | | | | | 400 | 5 | Class | 250 ns | 15ms |
| | | | | | | | | | 500 | 10 | Class | 250ns | 15ms |
| 2 | 871 | 12.3.11 | FE | 40 Mbps | 85% | 10 Mbps | 20 Mpbs | 30 Mbps | 250 | 0 | Priority | 110 ns | 10ms |
| | | | | | | | | | 300 | 0 | Priority | 110 ns | 10ms |
| | | | | | | | | | 350 | 2 | Priority | 110 ns | 10ms |
| | | | | | | | | | 400 | 3 | Priority | 110 ns | 10ms |
| | | | | | | | | | 300 | 5 | Class | 245 ns | 20ms |
| | | | | | | | | | 350 | 5 | Class | 245 ns | 20ms |
| | | | | | | | | | 400 | 5 | Class | 245 ns | 20ms |
| | | | | | | | | | 500 | 10 | Class | 245 ns | 20ms |

Fig. 5A

| Best practices | |
|---|---|
| Rule 1 | Real time traffic should never reserve more than 1/3 of the entire bandwidth |
| Rule 2 | Policer rate values should be higher than minimum bandwidth gurantee values |
| Rule 3 | Turning on header compression can use excessive CPU |
| Rule 4 | Low bandwidth links should use fragmentation to reduce serialization delays |
| Rule 5 | Application statistics are not supported on Cisco 871 models |

Fig. 5B

| Sampling Data over Time | | | |
|---|---|---|---|
| Application | Type | Average Rate % of 100 Mbps | Peak Rate % of 100Mbps |
| RTP | Real Time - Voice | 18 | 20 |
| FTP | Bulk | 6 | 8 |
| HTTP | Bulk | 6 | 12 |
| Microsoft Exchange | Transactional | 3 | 5 |
| Telnet | Transactional | 2 | 5 |

Fig. 5C

SYSTEM AND METHOD FOR NETWORK DEVICE CONFIGURATION

The U.S. Government has a paid-up license in this invention and the right in limited circumstances to require the patent owner to license others on reasonable terms as provided for by the terms of Contract No. N00014-04-C-0478 awarded by The Office of Naval Research.

BACKGROUND

In today's highly networked world, it is important for computer and network professionals to have basic knowledge of both network hardware, software and their associated configuration options. In order to increase networking efficiencies, bandwidth and functionality, many companies have been busy designing, testing and deploying network devices. Such devices include, but are not limited to, routers, network hubs, switches, repeaters, network interface cards, and other related networking infrastructure. As the proliferation of such networking devices continues to grow and new devices are constantly being released, more and more functionality tends to be added to the different devices to deal with various enhancements.

Unfortunately, the addition of enhancements also means that network professionals must learn what the enhancements are for and how to set the parameters that best enable the particular enhancements. Many times, the introduction of certain enhancements, although well intended, to handle a particular issue, can cause conflicts with existing settings. To complicate this further, network professionals are required to understand how certain enhancements are or are not set in particular network devices. Even when network devices are purchased from the same manufacturer, the settings and parameters can cause conflicts in one device and no conflicts in other devices.

Consequently, as more and more devices are introduced into the market, network professionals are strained to quickly learn the intricacies of the new settings, features and learn how certain settings may impact operation, quality of service (QoS), and other aspects.

In an effort to deal with the ever increasing pressures of learning new network devices, manufacturers of these devices provide detailed manuals. These detailed manuals, however, are so complex, voluminous and not always accurate or detailed that network professionals often times have to take courses to simply learn how to configure the device into their network or networks. Of course this assumes that the network professional has an understanding of the technology being addressed, else training on the technology is also necessary. As this process is time consuming, many network professionals who are pressured with time constraints do not take these courses and simply attempt to install the device using basic knowledge or experience. Although this is a fair solution for network professionals having sufficient experience with network equipment, network topologies and design, protocols, QoS rules, and settings, a larger number of network professionals do not have the skills needed to properly set up a system by purely establishing "best guess" settings and quick skimming of voluminous manuals provided by the device manufacturers.

In many cases, a company that is implementing a given network device cannot risk configuring a network device that will provide inadequate QoS or associated settings. For instance, if an incorrect setting is established for QoS, a network may fail to provide sufficient bandwidth for voice data or certain mission critical data transfers. If voice data is not provided with sufficient priority or bandwidth, for example, the company may be detrimentally impacted as their voice calls will experience disruptions that can make conversations unintelligible.

Thus, for companies that must have a proven solution in place before it is launched live, network professionals are forced to set up a test network to verify proper operations prior to deploying it live. The test network, often referred to as a test lab, requires the network professional to purchase several network devices (including the device under test (DUT)), test equipment, interconnect several computers and then run network traffic tests to attempt a simulation of the DUT in the target setting for which the DUT is intended. The building of this test network is a very manually intensive process that requires significant expenditures in test equipment for the simulation of test traffic, response times, latencies, QoS parameters, and changes in the simulations to test impacts in minor or major changes in network traffic. There is also the associated cost involved with training on the use of the test equipment and proper analysis of the test equipment results.

Although the test network results are obtained and can be used in the ultimate configuration of a live network device, the time expenditure, test equipment costs, and laborious network professional time to obtain these results can be so high that many firms simply cannot afford to take on the manual process. As a result, many network professionals tend to avoid upgrading to new network devices or simply use best guesses to set up new network devices. Of course, when devices are set up without the knowledge of what may happen under certain network traffic, the network professionals are taking the risk of having the network devices operate at less than optimal settings or at settings that can degrade the service needed in certain latency or mission critical application environments.

SUMMARY

In one embodiment, a method for identifying configuration parameters for a network device is disclosed. The method includes generating a stream of traffic data, where the traffic data has a known characteristic. Then, applying the stream of traffic data to the network device, where the network device has a specific type, and the network device generates an output based on the traffic data. The method then includes monitoring performance of the network device while the traffic data is processed by the network device, and the monitoring is configured to generate monitoring data for the traffic data applied to the network device having the specific type. Also, the method includes analyzing the output from the network device, where the analyzing is performed to identify how the traffic data was handled by the network device, and the analyzing is configured to generate performance metrics. The method further includes saving the monitoring data and the performance metrics to a knowledge database. The knowledge database is capable of being accessed to enable configuration of another network device based on the monitoring data and performance metrics.

The knowledge database, once populated with empirical testing of various network devices, can be used to set configuration parameters of those specific devices, and the knowledge database is used to provide a user with recommended settings and predicted results if the recommended settings are used. In a further embodiment, the recommended settings, once implemented in the network device, can be verified, tested and monitored. The predicted results can then be correlated to actual results. The empirical testing performed in advance, and such empirical test data stored in the knowledge database advantageously enables a network professional to quickly determine a configuration setting for a device, and know with good certainty what the predicted results might be for the recommended settings or desired settings. Knowledge of the predicted results is, in one embodiment, advantageously determined without having to set up a costly test lab. This provides tremendous savings in time, resources and the avoidance of aggravation. Additionally, network professional can more quickly setup, configure, test and verify network devices, while having the confidence that their setup configuration will deliver the proper performance, QoS and other settings.

In another embodiment, a computer implemented method for ascertaining configuration parameters for routers is provided. The method includes (a) defining traffic data to be applied to a router of a particular type; (b) setting configuration parameters of the router to a plurality of test settings; (c) applying the traffic data to the router when the router is in each of the plurality of test settings; (d) monitoring performance of the router during the application of the traffic data; (e) analyzing output from the router during the application of the traffic data; and (f) building a knowledge database from data obtained from the monitoring of the performance of the router and data obtained from the analyzing of the output. The knowledge database is configured to be used to provide suggested configuration parameters when configuring a new router having the particular type.

In a further aspect of this embodiment, the suggested configuration parameters for the new router are generated by accessing data in the knowledge database and determining an implementation environment for the new router. And, the implementation environment defines types of traffic to be handled by the new router.

In still another aspect of this embodiment, this method includes defining a network configuration tool user interface for performing (a)-(f). Then, using the network configuration tool user interface to apply the suggested configuration parameters to the new router. And, using the network configuration tool user interface to run a verification and mentoring process. The suggested configuration parameters for the new router can then be correlated against actual performance and output data of the new router.

In yet another aspect of this embodiment, through the network configuration tool user interface, the method includes providing one of textual or graphical, or a combination of textual and graphical representations of the configuration settings, recommended settings, predicted results, simulation data, verification and testing data, and monitoring data.

Other aspects of the invention will become apparent from the following detailed description, taken in conjunction with the accompanying drawings, illustrating by way of example the principles of the invention.

BRIEF DESCRIPTION OF THE DRAWINGS

FIG. 3 is an illustration showing an exemplary table of test case information and associated results, in accordance with one embodiment of the present invention;

FIGS. 4A through 4E are illustrations showing an alternative representation of test case information and associated results, in accordance with one embodiment of the present invention;

FIG. 5A is an illustration showing an exemplary knowledge database schema with test results data populated therein, in accordance with one embodiment of the present invention;

FIG. 5B is an illustration showing an extension of the knowledge database schema of FIG. 5A to include best practices data, in accordance with an exemplary embodiment of the present invention;

FIG. 5C is an illustration showing an extension of the knowledge database schema of FIG. 5A to include historical data, in accordance with an exemplary embodiment of the present invention;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
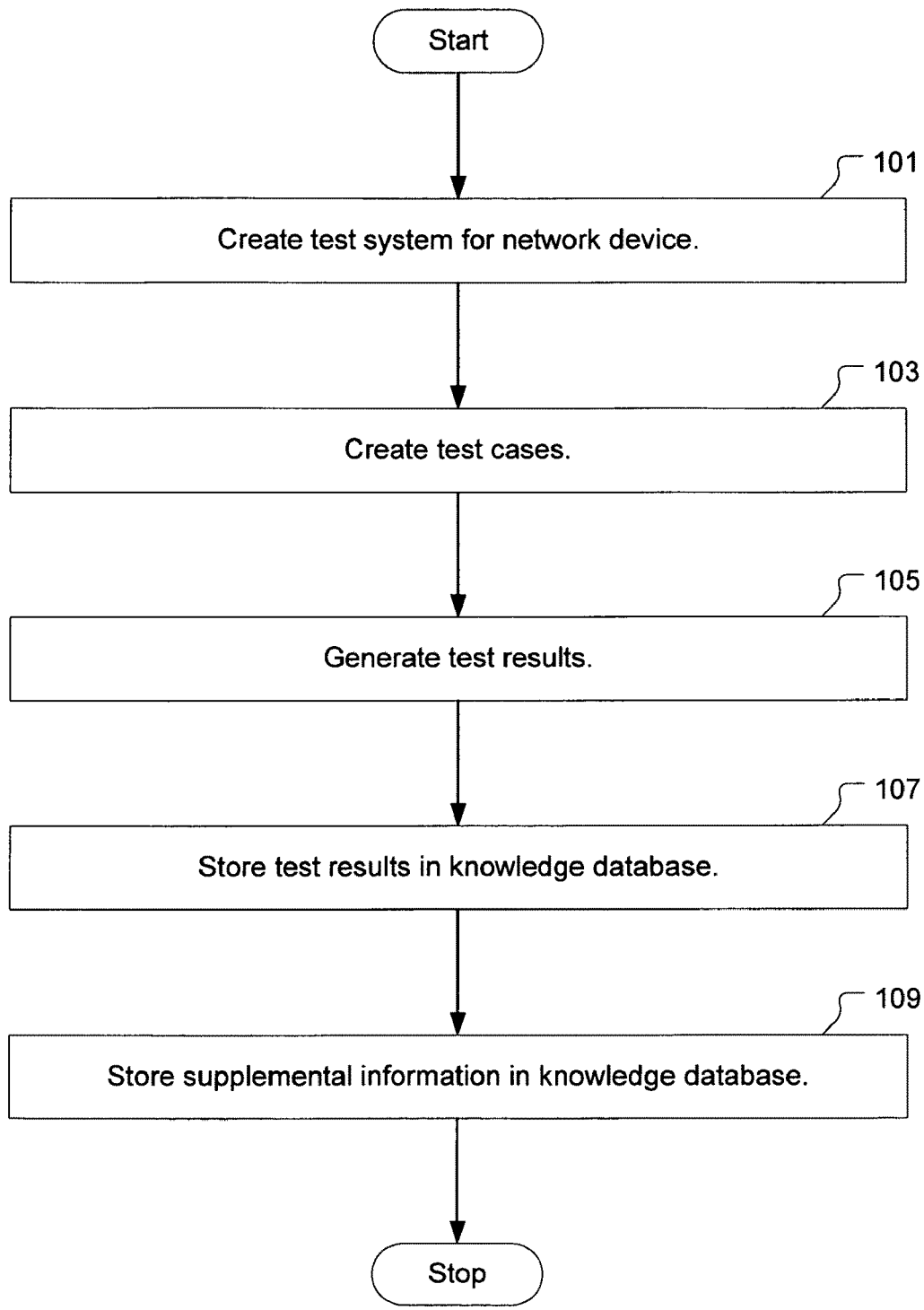
FIG. 1 is an illustration showing a flowchart of a method for generating a network device knowledge database, in accordance with one embodiment of the present invention.

FIG. 1 is an illustration showing a flowchart of a method for generating a network device knowledge database, in accordance with one embodiment of the present invention. The method begins with an operation 101 for creating a test system for a network device. The network device can represent any type of device through which data traffic is transferred during network communication. For example, in one embodiment the network device is a router.

Figure 2:
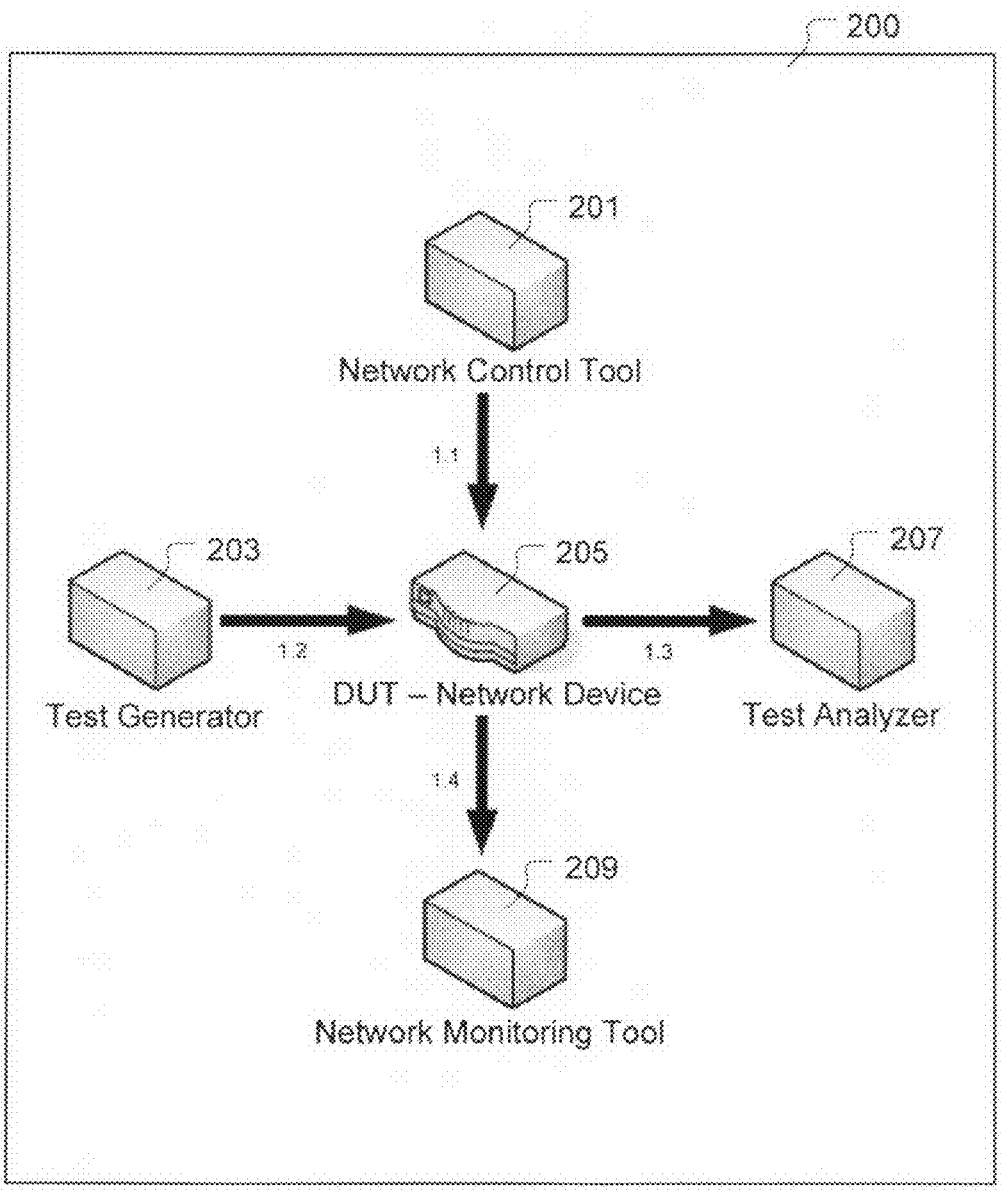
FIG. 2 is an illustration showing a test system, in accordance with one embodiment of the present invention.

FIG. 2 is an illustration showing a test system 200 created in the operation 101, in accordance with one embodiment of the present invention. The test system 200 includes a device under test (DUT) 205 connected to receive data communications from a network control tool 201 and a test generator 203, as indicated by arrows (1.1) and (1.2), respectively. In one embodiment, the DUT 205 is a router. However, it should be appreciated that the DUT 205 can also be any type of networking device other than a router. Additionally, in one embodiment, rather than the DUT 205, a system under test (SUT) is connected within the test system 200, wherein the SUT can represent any combination of network devices. For ease of description, the test system 200 will be described hereafter as including the DUT 205.

The network control tool 201 is a software module defined to enable a user, e.g., a network test engineer, to apply a configuration to the DUT 205. One example of the network control tool 201 is a configuration interface uniquely associated with the DUT 205. When the test system 200 is utilized to perform a particular test on the DUT 205, the user can use the network control tool 201 to configure the DUT 205 in a manner appropriate for the particular test to be performed. In one embodiment, the DUT 205 is capable of being configured in multiple ways. Therefore, the test results obtained from the test system 200 will be correlated to the particular configuration of the DUT 205 when the test is performed. Thus, it should be appreciated that configuration of the DUT 205 through the network control tool 201 can be considered as a test input.

The test generator 203 is a hardware and/or software module defined to apply network input to the DUT 205. In one embodiment, the network input takes the form of data communication, i.e., network traffic, for which the handling performance thereof by the DUT 205 is of interest. The test generator 203 is capable of simultaneously generating any number of network traffic threads to be processed as network input by the DUT 205. For example, if a test is defined to investigate how the DUT 205 handles multiple types of network traffic, the test generator 203 can be programmed to simultaneously generate the multiple types of network traffic.

The test system 200 further includes a test analyzer 207 and a network monitoring tool 209, which are each connected to receive data from the DUT 205, as indicated by arrows (1.3) and (1.4), respectively. The test analyzer 207 is a hardware/software module defined to record the output from the DUT 205. In one embodiment, the output recorded by the test analyzer 207 takes the form of network communication data that would be output from the DUT 205 based on both the network traffic generated by the test generator 203 and the DUT 205 configuration set through the network control tool 201. The test analyzer 207 is defined to analyze the recorded output from the DUT 205 to determine various network metrics such as jitter, output rate, latency, bit errors, packet drops, reorder instances, fragmentation instances, among others. In addition to the specific network metrics identified above, it should be understood that the test analyzer 207 can be defined to determine essentially any other type of network metric.

The network monitoring tool 209 is a hardware/software module defined to monitor the internal operations of the DUT 205 during test performance. In one embodiment, the network monitoring tool 209 functions to record the state of the DUT 205 during test performance based on the state monitoring capabilities afforded by the DUT 205. In various embodiments, the network monitoring tool 209 can be defined to record device metrics such as CPU usage, memory usage, pre-policy rate, post-policy rate, queue depth, packet drops, among others. In addition to the specific device metrics identified above, it should be understood that the network monitoring tool 209 can be defined to determine essentially any other type of device metric.

Returning to the method of FIG. 1, following creation of the test system 200 for the network device, i.e., DUT 205, the method proceeds with an operation 103 for creating test cases to be performed on the network device. In one embodiment, the test cases are created manually by a network test engineer. In another embodiment, the test cases can be created automatically based on a set of general specifications provided by a network test engineer. Each test case is defined based on both the configuration of the DUT 205 as established through the network control tool 201, and the network traffic provided as input to the DUT 205 from the test generator 203. In the embodiment where the DUT 205 is a router, the configuration can be characterized by the following parameters: router model number, router operating system, router hardware, memory type and size, router policy, etc. Also, in the embodiment where the DUT 205 is a router, the input network traffic can be characterized by the following parameters: packet type, packet length, source port, destination port, data rate, data flow characteristics, etc.

Following the operation 103, the method proceeds with an operation 105 for exercising the test system 200 to generate the test results corresponding to the test cases created in operation 103. FIG. 3 is an illustration showing an exemplary table of test case information and associated results obtained by performing operations 101 through 105, in accordance with one embodiment of the present invention. It should be understood that the test case information and results presented in FIG. 3 are provided for exemplary purposes only and are not intended to represent/provide any restrictions on the types of test cases that may be performed using the present invention.

FIG. 3 shows a test case "Case 1" performed on a "Cisco 871" router. Test case "Case 1" actually represents three separate tests identified by "Time 0," "Time 1," and "Time 2," wherein each test corresponds to a particular router configuration and a particular type/combination of network input traffic. The test performed at "Time 0" is based on a router configured to have three input queues corresponding to quality of service (QoS) Class A, Class B, and Class C, respectively. Class A is specified as a priority queue having a minimum bandwidth guarantee of 100 Kbps and a policer bandwidth of 110 Kbps. Class B is specified as a class-based queue having a minimum bandwidth guarantee of 200 Kbps and a policer bandwidth of 210 Kbps. Class C is specified as another class-based queue having a minimum bandwidth guarantee of 300 Kbps and a policer bandwidth of 310 Kbps. The router configurations for the tests performed at "Time 1" and "Time 2" are specified in a manner similar to that described above for the "Time 0" test.

During the performance of the "Time 0" test, UDP-RTP packets of 300 byte fixed length are transmitted from the test generator 203 to the Class A priority queue at a rate of 125 Kbps. Also, during the performance of the "Time 0" test, TCP-Telnet packets of 500 byte fixed length are transmitted from the test generator 203 to the Class B priority queue at a rate of 150 Kbps. Also, during the performance of the "Time 0" test, TCP-HTTP packets of 1000 byte fixed length are transmitted from the test generator 203 to the Class C priority queue at a rate of 175 Kbps. The input network traffic for the tests performed at "Time 1" and "Time 2" are specified, generated, and transmitted in a manner similar to that described above for the "Time 0" test.

During the performance of each test, the network monitoring tool 209 is operated to monitor the router CPU usage, memory usage, pre-policy rate on each input queue, and post-policy rate on each input queue. For example, during the performance of "Time 0" test, the network monitoring tool 209 records a CPU usage of 23% and a memory usage of 7%. The network monitoring tool 209 confirms that the pre-policy rate on each of the QoS Class A, B, and C queues is 125 Kbps, 150 Kbps, and 175 Kbps, respectively. During the performance of "Time 0" test, the network monitoring tool 209 also records the actual post-policy rate on each of the Class A, B, and C queues as 110 Kbps, 150 Kbps, and 175 Kbps, respectively. For the tests performed at "Time 1" and "Time 2," the router (DUT 205) is also monitored through the network monitoring tool 209 in a manner similar to that described above for the "Time 0" test.

During the performance of each test, the test analyzer 207 is operated to record and analyze the router (DUT 205) output, including jitter, output rate, and latency. For example, during the performance of "Time 0" test, the jitter, output rate, and latency for the Class A queue is analyzed as 100 ns, 125 Kbps, and 8 ms, respectively. Also, during the performance of "Time 0" test, the jitter, output rate, and latency for the Class B queue is analyzed as 250 ns, 150 Kbps, and 10 ms, respectively. Similarly, during the performance of "Time 0" test, the jitter, output rate, and latency for the Class C queue is analyzed as 250 ns, 175 bps, and 10 ms, respectively. For the tests performed at "Time 1" and "Time 2," the router (DUT 205) output is recorded and analyzed with the test analyzer 207 in a manner similar to that described above for the "Time 0" test.

It should be appreciated that the specific characterizing parameters for the router configuration and test generator as presented in FIG. 3 are not intended to represent an inclusive set of characterizing parameters. For example, depending on the particular network device, there may be additional configuration parameters specified. Also, in some embodiments the input network traffic may be characterized by more parameters than type, rate, and length. Furthermore, those skilled in the art should appreciate that the internal operation of various network devices can be characterized in terms of parameters other than CPU usage, memory usage, pre-policy rate, and post-policy rate. Therefore, it should be understood that the router monitoring parameters presented in FIG. 3 are not intended to represent an inclusive set of network device monitoring parameters. Similarly, those skilled in the art should appreciate that the output of various network devices can be analyzed in terms of parameters other than jitter, output rate, and latency. Therefore, it should be understood that the test analyzer parameters presented in FIG. 3 are not intended to represent an inclusive set. Further, those skilled in the art should appreciate that the network device can easily be substituted by a system.

In addition to the foregoing, it should be appreciated that the test results generated in operation 105 of the method can be managed in a form different from that explicitly presented in FIG. 3. For example, FIGS. 4A through 4E are illustrations showing an alternative representation of test case information and associated results obtained by performing operations 101 through 105 of the method of FIG. 1, in accordance with one embodiment of the present invention.

Returning to the method of FIG. 1, the method proceeds with an operation 107 for storing the test results generated in the operation 105 in a knowledge database. It should be appreciated that the knowledge database can be defined using essentially any type of database software that supports a query function. For example, in one embodiment, the knowledge database is implemented as an SQL database. In various embodiments, the knowledge database can be defined to include all or a portion of the test results generated in operation 105. Additionally, in one embodiment, the raw test results generated in operation 105 can be consolidated through an analytical and/or comparative process to obtain an abridged version of the test results to be stored in the knowledge database. Also, the schema of the knowledge database is defined to accommodate the test results in a form required to support subsequent query operations.

FIG. 5A is an illustration showing an exemplary knowledge database schema with test results data populated therein, in accordance with one embodiment of the present invention. The knowledge database schema provides fields for database entry number, router model, router operating system, router interface, forwarding limits on input, forwarding limits on CPU, CPU usage based input rate, and output behavior. As a function of input rate, the output behavior can be specified as queue depth, queue type, jitter, and latency. It should be appreciated that the knowledge database schema of FIG. 5A does not include all the information that is available in the raw test results from operation 105. For example, the correlation between output behavior and queue structure is not provided in the schema of FIG. 5A. Thus, FIG. 5A represents an example of the knowledge database wherein the raw test results generated in operation 105 have been consolidated through an analytical and/or comparative process to obtain an abridged version of the test results to be stored in the knowledge database. The abridged version of the test results as represented by the knowledge database schema is defined based on a target application of the knowledge database. For example, the exemplary knowledge database of FIG. 5A is defined based on the consideration that dependencies between output behavior and queue structure is not significant for the target application of the knowledge database.

In addition to storing the test results in the knowledge database, the method also includes an operation 109 for storing supplemental information in the knowledge database. In one embodiment, the supplemental information can include additional information regarding best practices for network configuration, which may include limitations for the particular configuration for the particular network device, and sampled data for network operation. FIG. 5B is an illustration showing an extension of the knowledge database schema of FIG. 5A to include best practices data, in accordance with an exemplary embodiment of the present invention. As shown in FIG. 5B, the best practices schema is defined as a list of "rules." However, it should be appreciated that other embodiments can implement alternate schemas for the best practices portion of the knowledge database. FIG. 5C is an illustration showing an extension of the knowledge database schema of FIG. 5A to include historical data, i.e., sampling data over time, in accordance with an exemplary embodiment of the present invention. In one embodiment, the historical data is entered into the knowledge database according to a schema having correlated entries for application protocol, communication type, average data rate as percent of 100 Mbps, and peak data rate as percent of 100 Mbps. As with the best practices schema, it should be appreciated that other embodiments can implement alternate schemas for the historical data portion of the knowledge database.

Figure 6:
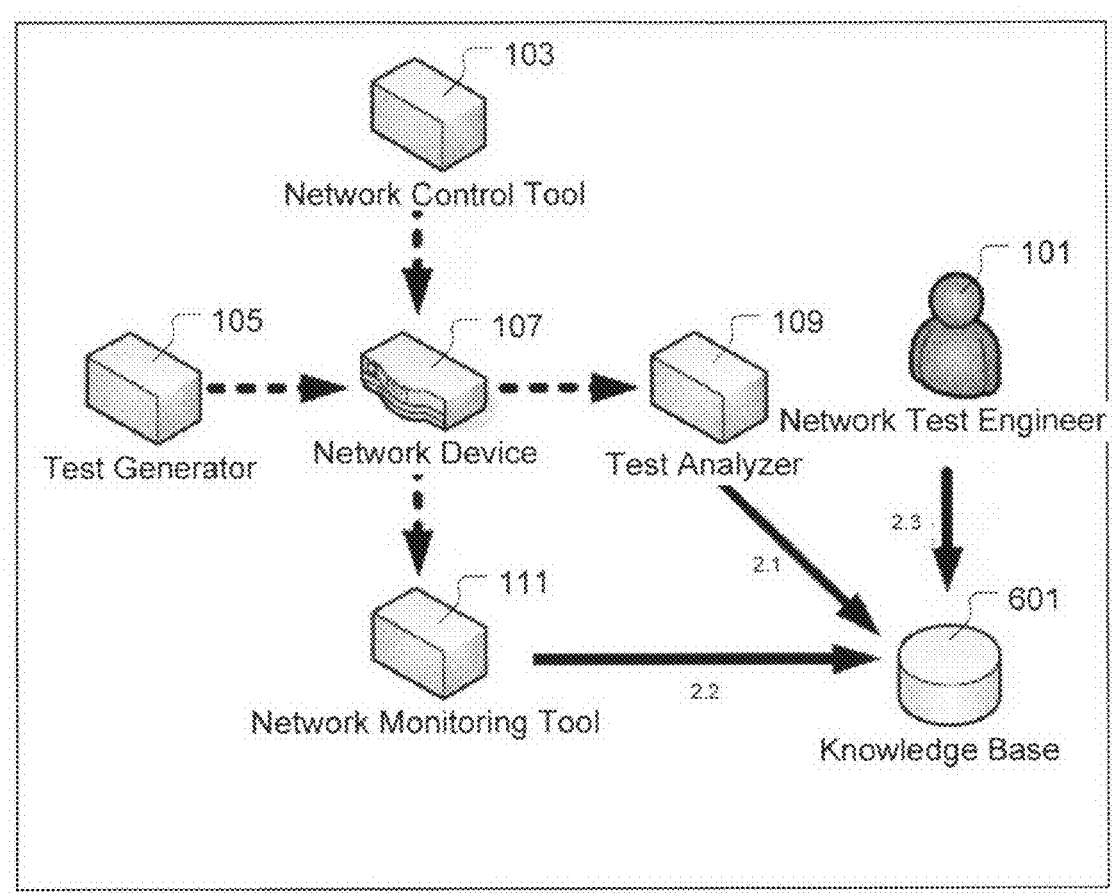
FIG. 6 is an illustration showing the interactions between the test system, the network test engineer, and the knowledge database, in accordance with one embodiment of the present invention.

FIG. 6 is an illustration showing the interactions between the test system 200, the network test engineer 101, and the knowledge base 601 in performing the operations 107 and 109, in accordance with one embodiment of the present invention. The raw test data having been recorded and analyzed by the test analyzer 109 is processed according to the requirements of the knowledge database schema and is entered into the knowledge database 601, as indicated by arrow (2.1). The raw test data having been recorded and analyzed by the test analyzer 109 is processed according to the requirements of the knowledge database schema and is entered into the knowledge database 601, as indicated by arrow (2.1). The data having been recorded by the network monitoring tool 111 is also processed according to the requirements of the knowledge database schema and is entered into the knowledge database 601, as indicated by arrow (2.2). Additionally, the network test engineer 101 directs entry of the best practices for network configuration and historical data into the knowledge database 601, as indicated by arrow (2.3).

Figure 7:
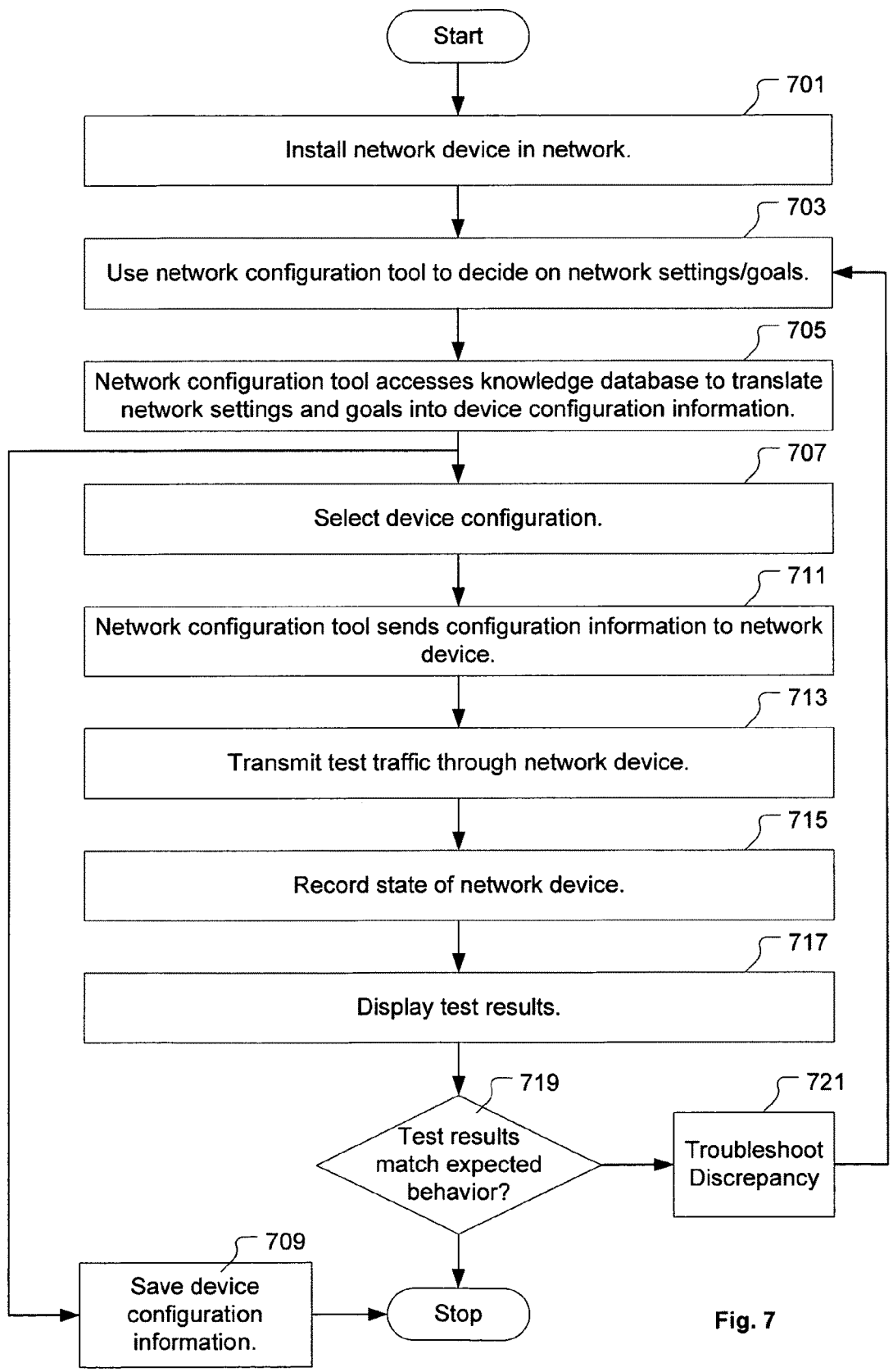
FIG. 7 is an illustration showing a flowchart of a method for optimally configuring a network device by utilizing the knowledge database developed according to the method of FIG. 1.

According to one embodiment of the present invention, FIG. 7 is an illustration showing a flowchart of a method for optimally configuring a network device by utilizing the knowledge database developed according to the method of FIG. 1. The method begins with an operation 701 for installing a network device in a network. In one embodiment, the network device is a router. However, it should be appreciated that the network device can also be any type of networking device other than a router. For the knowledge database to be directly applicable in providing information for optimally configuring the network device, the network device installed in operation 701 should correspond to the DUT 205 or SUT analyzed in the test system 200 to populate the knowledge database. However, in some embodiments, the network device installed in operation 701 may differ from the DUT 205 analyzed in the test system 200, but remain sufficiently similar to the DUT 205 such that the knowledge database content is sufficiently applicable to the network device.

The method proceeds from the operation 701 to an operation 703 in which a network engineer uses a network configuration tool to decide on network settings/goals for the network device installed in operation 701. Examples of the network settings/goals can include the various network traffic types expected to be handled by the network device, the latency goal for network traffic type, and the loss goal for each network traffic type, among others. The network setting/goals may be considered as an establishment of criteria to be satisfied by a QoS to be implemented within the network device.

The method proceeds from the operation 703 to an operation 705 in which the network configuration tool accesses the knowledge database to translate the network settings/goals from operation 703 into configuration information for the network device. In one embodiment, the network configuration tool will use the knowledge database content to formulate different configuration scenarios and choices that will satisfy the user-supplied network settings/goals. For example, the network configuration tool may use the best practices content of the knowledge database to define an input queue that is appropriate for each of the network traffic types expected to be handled by the network device. In one embodiment, the input queues are defined by queue classification, minimum bandwidth guarantee, and policing (maximum) bandwidth. For example, based on the best practices content of the knowledge database, the network configuration tool may allocate a priority queue classification to an input queue defined to handle real-time voice network traffic. Also, based on the best practices content and the historical data content of the knowledge database, the network configuration tool may allocate a minimum bandwidth guarantee value and a policing bandwidth value to each of the defined input queues.

The network configuration tool also functions to provide predicted network device performance data for each input queue defined by the network configuration tool. For example, for each defined input queue, the network configuration tool will allow a user to select a network traffic input rate, e.g., Kbps. Then, the network configuration tool will query the test results content of the knowledge database to determine network device performance data associated with the selected network traffic input rate. Examples of the types of network device performance data include latency, packet loss, jitter, packet reorder instances, bit error instances, and fragmentation instances, among others. By selecting different network traffic input rates for each input queue, the user (network engineer) can investigate how the network device will perform in handling each type of expected network traffic, given the input queue structure and QoS recommended by the network configuration tool.

Following the operation 705, the method proceeds with an operation 707 for selecting an optimized configuration for the network device based on the recommended settings and predicted results provided by the network configuration tool for the user-supplied network settings/goals. In one embodiment, the method proceeds from the operation 707 to an operation 709 for saving the selected network device configuration to a persistent storage device. The network device configuration information on the storage device can then be transmitted to another location where the actual network device is to be installed and configured. In another embodiment, the method proceeds from the operation 707 to an operation 711 for sending the selected network device configuration to the network device, such that the network device is configured accordingly.

Following operation 711, the method proceeds with a series of operations for performing verification and testing of the configured network device. In an operation 713, test traffic is transmitted through the network device. In one embodiment, the configured network device resides within a network that includes other devices that are capable of generating test traffic. In this embodiment, the network engineer performs operation 713 by programming one or more devices in the network to transmit test traffic through the configured network device to be verified and tested. In another embodiment, the verification and testing can be performed using normal network traffic transmitted through the configured network device to be verified and tested. In this embodiment, it is not necessary for the network to include devices that have the test traffic generation capability.

As the test traffic or normal network traffic is transmitted through the configured network device, an operation 715 is performed to record a state of the network device that is being verified and tested. In one embodiment, the state of the network device is recorded using the network monitoring tool 111, previously described with respect to the test system 200 of FIG. 1. In this embodiment, the network monitoring tool 111 will retrieve appropriate measurement data from the network device. Then, an operation 717 is performed to display the test results, i.e., measurement data retrieved from network device, to the network engineer. In an alternate embodiment, the test results can be stored in a persistent storage device for later review and analysis.

The method proceeds with a decision operation 719 for determining whether the test results from operation 715 match the expected behavior of the network device under test. If the test results do not demonstrate that the network device is behaving as expected, an operation 721 is performed to troubleshoot the discrepancy between the observed and expected network device behavior. The troubleshooting operation 721 directs the method back to operation 703 in which the network engineer uses the network configuration tool to decide on network setting and goals. If the test results indicate that the network device is behaving as expected, the network device is considered to be optimally configured and the method concludes.

Figure 8:
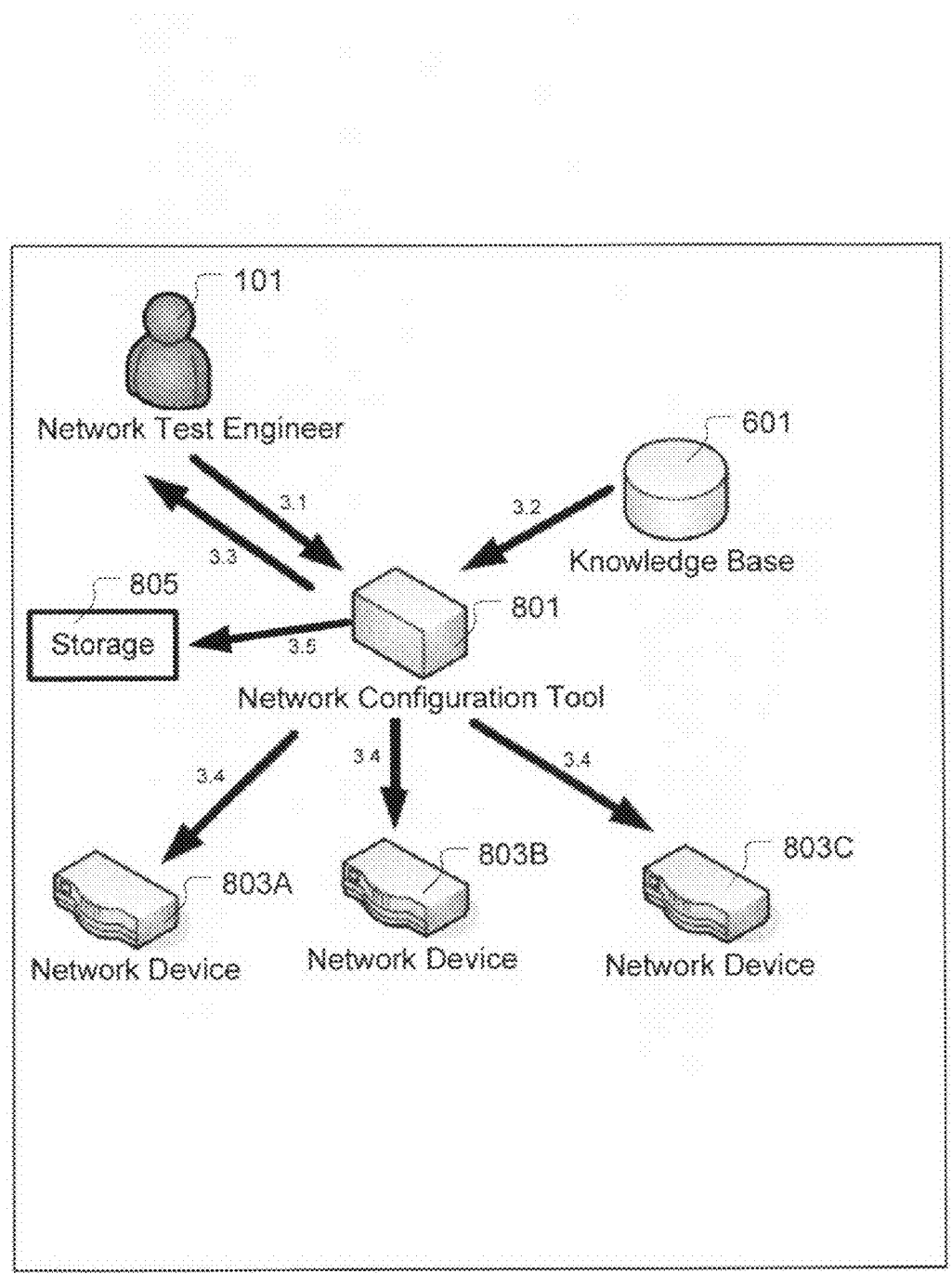
FIG. 8 is an illustration showing the interactions present in performing the device configuration process described in the method of FIG. 7, in accordance with one embodiment of the present invention.

FIG. 8 is an illustration showing the interactions present in performing the operations 701 through 711 of the method of FIG. 7, in accordance with one embodiment of the present invention. The network configuration tool 801 is defined to receive input from the network engineer 101, as indicated by arrow (3.1). For example, in performing operation 703, the network engineer 101 will provide the settings and goals for the network devices 803A, 803B, and 803C to the network configuration tool 801. Also, the network configuration tool 801 is defined to provide feedback to the network engineer 101, as indicated by arrow (3.3). For example, in performing operation 705, the network configuration tool 801 will provide to the network engineer 101 the predicted network device performance data for each defined input queue.

Additionally, in performing operation 705, the network configuration tool 801 will access the knowledge database 601, as indicated by arrow (3.2). According to operation 705, once the network device configuration is selected, the configuration data can be stored in the persistent storage device 805, as indicated by arrow (3.5). Also, according to operation 711, the selected network device configuration data can be used to configure each of the network devices 803A, 803B, and 803C, as indicated by arrows (3.4). Although the example of FIG. 8 indicates configuration of three network devices 803A, 803B, and 803C, it should be appreciated that the method of FIG. 7 is not limited to use in configuring a specific number of network devices. More specifically, the method of FIG. 7 can be implemented to configure one or more network devices in either a parallel or serial manner.

Figure 9:
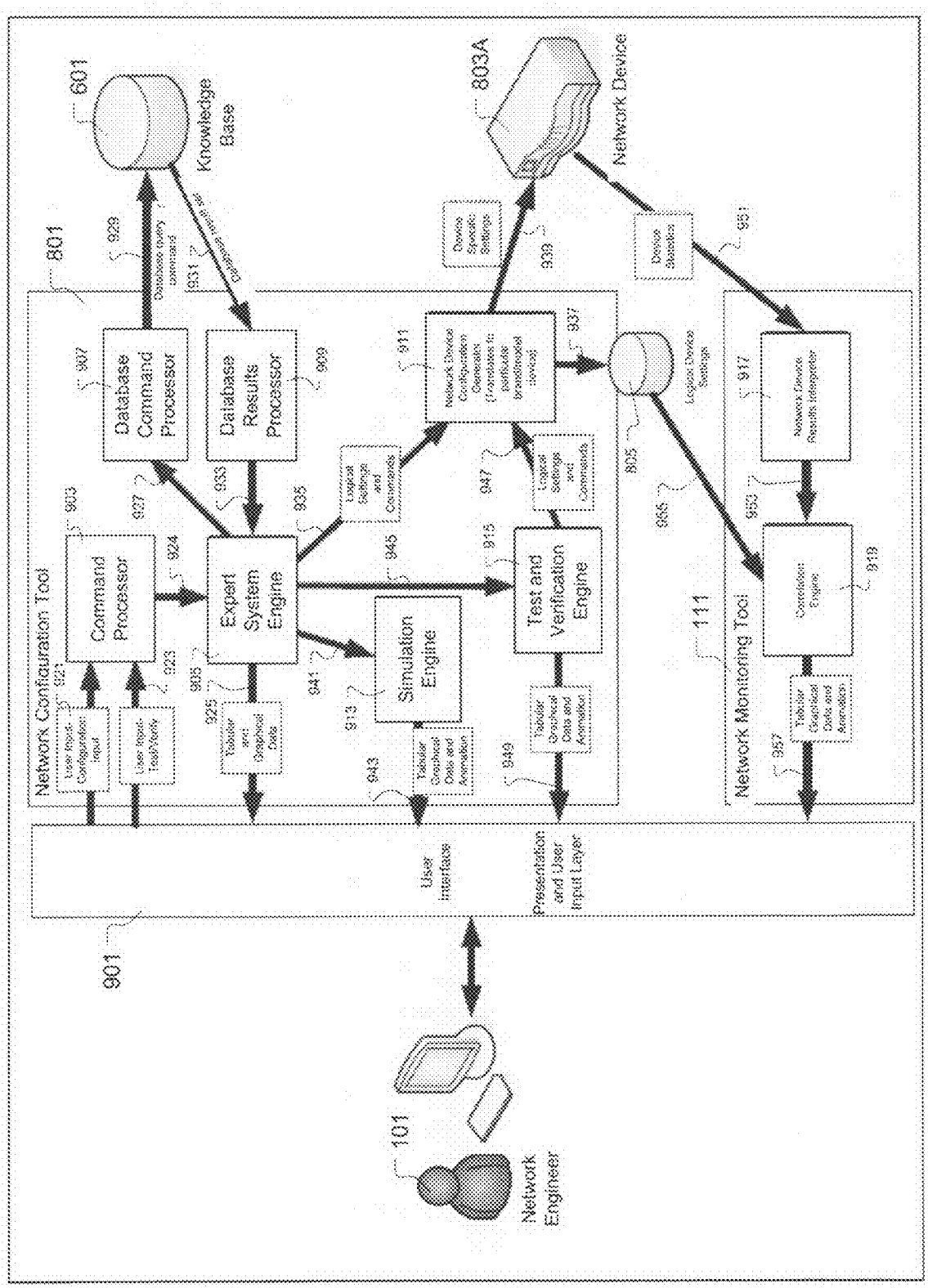
FIG. 9 is an illustration showing a logical representation of the network configuration tool and the network monitoring tool, as implemented in performing the method of FIG. 7, in accordance with one embodiment of the present invention.

FIG. 9 is an illustration showing a logical representation of the network configuration tool 801 and the network monitoring tool 111, as implemented in performing the method of FIG. 7, in accordance with one embodiment of the present invention. The network engineer 101 is capable of interfacing with the network configuration tool 801 and the network monitoring tool 111 through a user interface 901. The network configuration tool 801 includes a command processor module 903 defined to receive user input for selecting the settings and goals for the network device to be configured, as indicated by arrow 921. The command processor is also defined to receive user input for initiating the verification and testing of the configured network device, as indicated by arrow 923. Depending of the received user input, the command processor 903 communicates instructions to a system engine module 905, as indicated by arrow 924. The system engine module 905 operates to echo the user input back to the user through the user interface 901, as indicated by arrow 925.

The system engine module 905 also functions to process the user-specified settings and goals for the network device 803A into one or more formats that can be correlated with the content of the knowledge database 601. The system engine module 905 then determines the type of information that should be retrieved from the knowledge database to address each of the user-specified setting and goals for the network device 803A. Based on the type of information that should be retrieved from the knowledge database, the system engine module 905 formulates appropriate database access requests and communicates the database access requests to a database command processor module 907, as indicated by arrow. The database command processor module 907 converts the received database access requests into corresponding database query commands and queries the knowledge database 601, as indicated by arrow 929.

Query results generated by database query commands are transmitted from the knowledge database 601 to a database results processor module 909, as indicated by arrow 931. The database results processor module 909 functions to place the query results into a format that is suitable for communication to the system engine module 905, as indicated by arrow 933. Once the system engine module 905 receives the query results from the knowledge database 601, the system engine module 905 determines which network device configuration settings are optimal for satisfying the user-specified setting and goals. Then the optimal configuration settings are communicated to a network device configuration generator 911 module, as indicated by arrow 935. The network device configuration generator 911 module functions to translate the optimal configuration settings to a particular brand/model of the network device 803A being configured based on the syntax and command structure that is understood by the particular network device 803A. The translated configuration settings generated by the network device configuration generator 911 can be stored in persistent storage 805, as indicated by arrow, or can be used to configure the network device 803A, as indicated by arrow 939.

The system engine module 905 is also capable of directing a simulation engine module 913 to perform a simulation of the network device 803A performance based on the network device configuration settings that are determined to be optimal for satisfying the user-specified setting and goals, as indicated by arrow 941. In one embodiment, the simulation engine module 913 will use test results stored in the knowledge database 601 to simulate the performance of the network device 803A. The simulation engine module 913 is further defined to communicate the simulation results to the network engineer 101 through the user interface 901, as indicated by arrow 943.

The system engine module 905 is also capable of directing a test and verification engine 915 to perform verification and testing of the network device 803A, as indicated by arrow 945. In a manner consistent with the previously described method of FIG. 7, the test and verification engine 915 is defined to communicate logical settings and commands to the network device configuration generator module 911, as indicated by arrow 947, wherein the logical settings and commands may include instructions for generating and transmitting appropriate test traffic through the network device 803A. The network device configuration generator module 911 functions to translate the settings/command received from the test and verification engine module 915 to the particular brand/model of the network device 803A being tested based on the syntax and command structure that is understood by the particular network device 803A. Then, the test settings/commands are transmitted from the network device configuration generator module 911 to the network device 803A, as indicated by arrow 939. The test and verification engine module 915 also operates to echo the test settings/commands back to the user through the user interface 901, as indicated by arrow 949. In another embodiment, to perform verification, it may be an option to communicate to 803B or 803C to help generate traffic into 803A.

During verification and testing, statistical data regarding the internal operations of the network device 803A are communicated from the network device 803A to a network device results interpreter module 917 within the network monitoring tool 111, as indicated by arrow 951. The network device results interpreter module 917 functions to process the statistical data received from the network device 803A into a form that can be correlated to the configuration settings of the network device 803A. The processed statistical data is then communicated from the network device results interpreter module 917 to a correlation engine 919, as indicated by arrow. The correlation engine 919 is capable of accessing the configuration settings of the network device 803A stored on the persistent storage device 805, as indicated by arrow 955. The correlation engine 919 functions to evaluate the performance of the network device 803A as represented by the statistical data to the expected performance of the device as defined by the configuration settings. Based on the actual-to-expected network device performance evaluation results, the correlation engine 919 is capable of determining whether the network device 803A performance is acceptable. The correlation engine 919 is further defined to convey the processed statistical data and performance evaluation results to the network engineer 101 through the user interface 901, as indicated by arrow 957.

Figure 10:
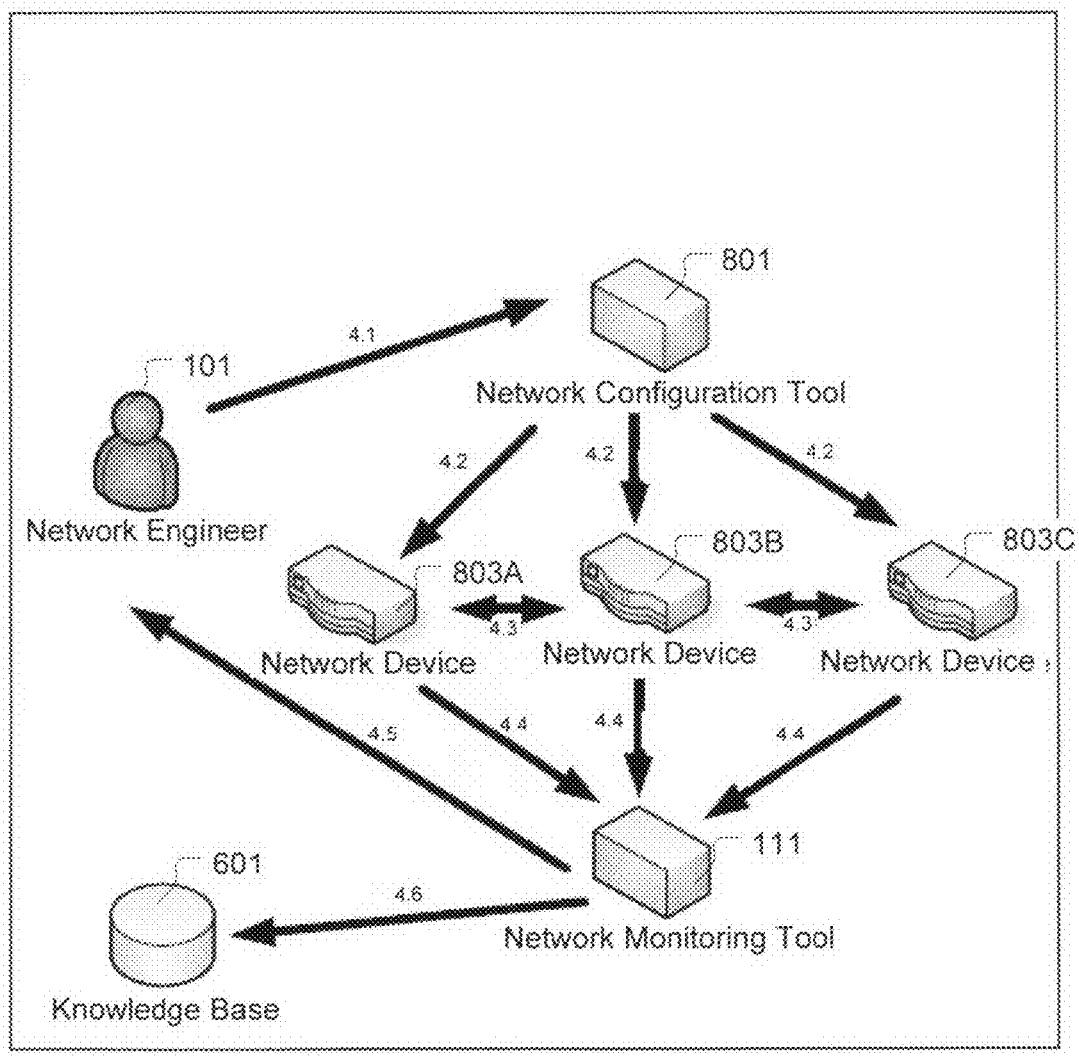
FIG. 10 is an illustration showing the interactions present in performing the testing/verification process described in the method of FIG. 7, in accordance with one embodiment of the present invention.

FIG. 10 is an illustration showing the interactions present in performing the testing/verification process described in operations 713 through 721 of the method of FIG. 7, in accordance with one embodiment of the present invention. The network engineer 101 initiates the testing and verification process by communicating appropriate commands to the network configuration tool 801, as indicated by arrow (4.1). As indicated by arrows (4.2), the network configuration tool 801 functions to program the network devices 803A, 803B, and 803C to generate test traffic to validate operations of one or more of the configured network devices 803A, 803B, and 803C. Although the example of FIG. 10 indicates the presence of three network devices 803A, 803B, and 803C, it should be appreciated that the testing and verification process can be performed using any number of network devices. For example, the testing can be performed by transmitting normal network traffic through one network device.

As the test traffic is transmitted through the one or more network devices (803A, 803B, 803C), the network monitoring tool 111 retrieves measurement data, i.e., statistical performance data, from the one or more network devices, as indicated by arrows (4.4). The network monitoring tool 111 functions to display the resulting measurement data and expected behavior of the one or more network devices (803A, 803B, 803C) to the network engineer 101, as indicated by arrow (4.5). Additionally, an optional operation can be performed to store the resulting measurement data and expected behavior of the one or more network devices (803A, 803B, 803C) in the knowledge database 601, as indicated by arrow (4.6), to further expand the depth of performance data characterized by the knowledge database 601.

Figure 11:
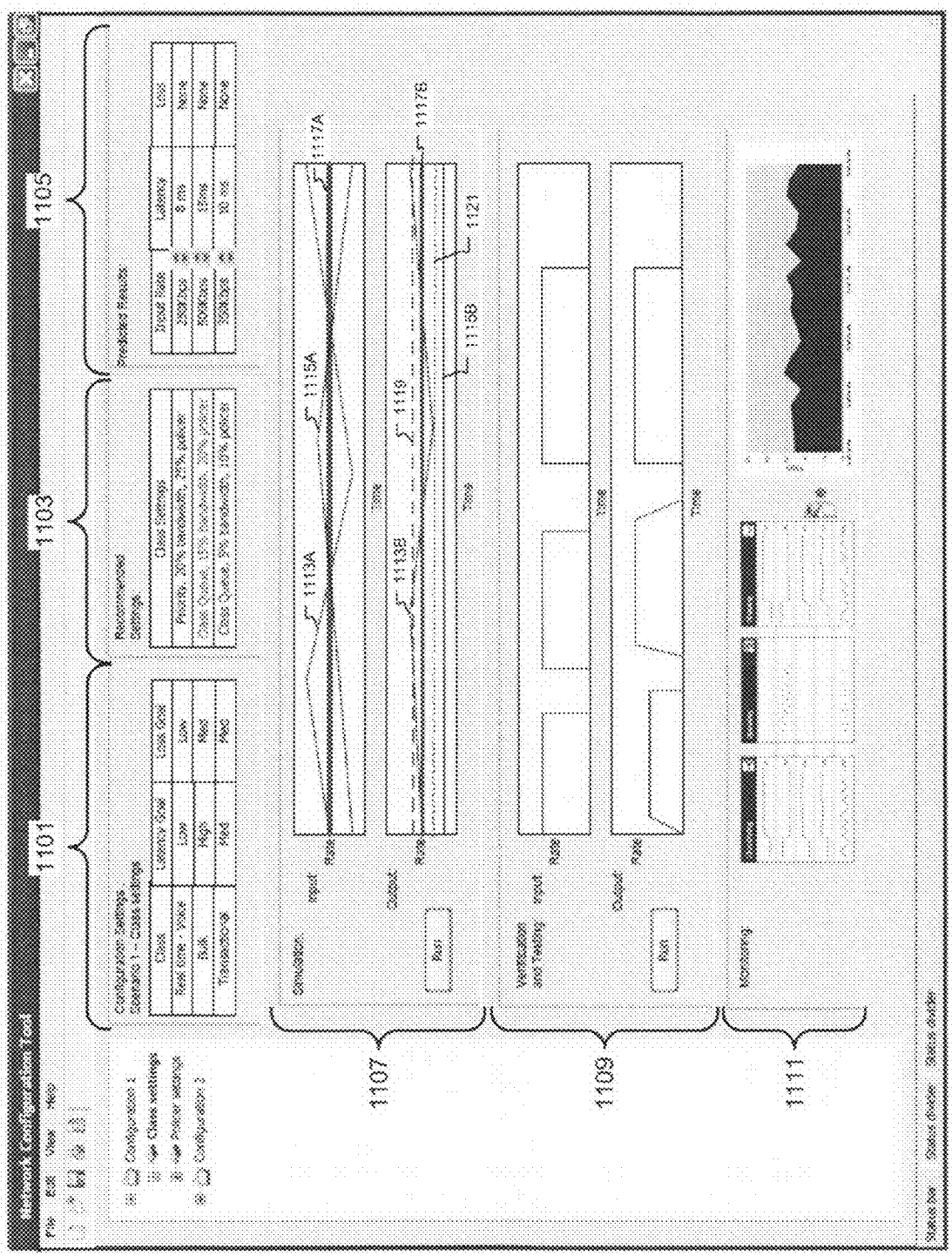
FIG. 11 is an illustration showing an example of the user interface, in accordance with one embodiment of the present invention.

FIG. 11 is an illustration showing an example of the user interface 901 previously described with respect to FIG. 9, in accordance with one embodiment of the present invention. The user interface 901 includes a configuration settings section 1101 in which the user can specify the setting and goals for the network device to be configured. In the example, the user has specified that three input queues be established for receiving real-time voice communication, bulk communication, and transactional communication, respectively. The user has specified a latency goal and a loss goal for each of the specified input queues.

The user interface 901 also includes a recommended settings section 1103 in which the network configuration tool 801 conveys recommended network device configuration settings for each user-specified input queue. Based on the best practices content of the knowledge database 601, the network configuration tool 801 has determined appropriate queue classifications for each of the user-specified input queues. For example, the input queue for receiving real-time voice communication has been classified as a priority queue, while the input queues for receiving bulk and transactional communications have each been classified as class queues.

Based on the best practices and historical data content of the knowledge database 601, appropriate minimum bandwidth guarantee values and policing bandwidth values have been determined for each of the user-specified input queues. For example, the input queue for receiving real-time voice communication has been assigned a 20% minimum bandwidth guarantee and a 25% policer bandwidth. In this example, the 20% minimum bandwidth guarantee for the real-time voice queue may have been derived from the historical data in the knowledge database 601 indicating that the real-time voice communication over the network hardly ever goes above 20% of the available device bandwidth. Also in this example, the 25% policer bandwidth for the real-time voice queue may have been derived from the best practices in the knowledge database 601 indicating that a voice queue exceeding 25% of the available bandwidth will cause an unacceptable degradation in processing of other types of network traffic.

The user interface 901 also includes a predicted results section 1105 in which the network configuration tool 801 conveys predicted performance results for each user-specified input queue. In one embodiment, the predicted results section 1105 provides a user-selectable input rate field for each user-specified input queue, and displays performance metrics for the instantly selected input rate. The performance metrics can include any number of data types. The example of FIG. 11 shows latency and loss performance metrics. However, it should be understood that additional performance metrics such as jitter, reorder, bit error, and fragmentation, among others, can also be conveyed through the predicted results section 1105. The network configuration tool 801 functions to query the knowledge database 601 to extract the performance metric values for the selected input rate and queue configuration settings, i.e., recommended settings. Based on the foregoing, it should be appreciated that a user can iteratively select input rates to investigate performance of a given input queue.

The user interface 901 also includes a simulation section 1107 for conveying simulation data. In one embodiment, the simulation data represents how each queue is expected to perform for a given network traffic pattern. The input and output of each queue is represented graphically in terms of data rate, e.g., Kbps, as a function of time, e.g., seconds. In the example of FIG. 11, the input network traffic pattern and corresponding output for the real-time voice queue is shown as curves 1115A and 1115B, respectively. The input network traffic pattern and corresponding output for the transactional queue is shown as curves 1117A and 1117B, respectively. Also, the input network traffic pattern and corresponding output for the bulk queue is shown as curves 1113A and 1113B, respectively. The graphical display of the simulation results can also convey other information such as the recommended setting for one or more of the queues. For example, the minimum bandwidth guarantee and the policing bandwidth of the bulk queue are shown as lines 1121 and 1119, respectively.

The user interface 901 can also include a verification and testing section 1109 for conveying testing data. In one embodiment, the testing data represents how each queue actually performs when subjected to a particular testing sequence. The input and output of the testing sequence is represented graphically in terms of data rate, e.g., Kbps, as a function of time, e.g., seconds. The user interface 901 can also include a monitoring section 1111 for displaying network device performance statistical data retrieved through the network monitoring tool 1111. The statistical data in the example of FIG. 11 includes classifying data rate, queue depth, shaping data rate, and router output rate as a function of time. However, it should be understood that the monitoring section 1111 can be defined to display essentially any network device performance metric known to those skilled in the art. The data displayed in the monitoring section 1111 corresponds to the current state of the network device being monitored.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, DVDs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for identifying configuration parameters for a network device, comprising:
    (a) generating a stream of traffic data, the traffic data having a known characteristic;
    (b) applying the stream of traffic data to the network device, the network device having a specific type, and the network device generating an output based on the traffic data;
    (c) monitoring performance of the network device while the traffic data is processed by the network device, the monitoring being configured to generate monitoring data for the traffic data applied to the network device having the specific type;
    (d) analyzing the output from the network device, the analyzing being performed to identify how the traffic data was handled by the network device, the analyzing being configured to generate performance metrics;
    (e) saving the monitoring data and the performance metrics to a knowledge database, wherein the knowledge database is capable of being accessed to enable configuration of another network device based on the monitoring data and performance metrics.

2. A method for identifying configuration parameters for a network device as recited in claim 1, further comprising:
    (i) identifying a particular network device for configuration;
    (ii) accessing the knowledge database, the knowledge database providing configuration parameters for the particular network device; and
    (iii) displaying predicted operational characteristics for the particular network device if the particular network device is implemented using the configuration parameters.

3. A method for identifying configuration parameters for a network device as recited in claim 2, further comprising:
    adding best practices data into the knowledge database;
    adding limitations of the network device into the knowledge database; and
    adding sampling data traffic for the new network device into the knowledge database, the best practices, limitations and the sampling data traffic being accessed to further define the configuration parameters and to further define the predicted operational characteristics of the particular network device.

4. A method for identifying configuration parameters for a network device as recited in claim 2, further comprising:
    (iv) providing a graphical user interface for enabling (i)-(iii), such that the graphical user interface enables user adjustments of the configuration parameters, and adjustments of one or more of the configuration parameters causes a change in the displayed predicted operational characteristics defined in (iii).

5. A method for identifying configuration parameters for a network device as recited in claim 4, further comprising:
    through the graphical user interface, allowing one of:
    causing an application of the configuration parameters to be set on the particular network device;
    causing the configuration parameters to be saved to a file;
    causing the configuration parameters to be printed; or
    causing the configuration parameters to be forwarded via a network to a remote computer or network device for application of the configuration parameters to another particular network device.

6. A method for identifying configuration parameters for a network device as recited in claim 4, further comprising:
    through the graphical user interface,
    causing the configuration parameters to be set on the particular network device; and
    verifying the configuration parameters by implementing the particular network device in a network, the verifying including a comparison of actual operational characteristics with the predicted operation characteristics of (iii).

7. A method for identifying configuration parameters for a network device as recited in claim 6, further comprising:
    saving to the knowledge database data regarding the verifying of the configuration parameters by the particular network device.

8. A method for identifying configuration parameters for a network device as recited in claim 7, wherein the data regarding the verifying of the configuration parameters is obtained over a network.

9. A method for identifying configuration parameters for a network device as recited in claim 6, wherein the user interface is part of a network configuration tool, and the network configuration tool is configured to be loaded on a computer that can interface with the network device during any one or all of:
    (I) empirical testing in operations (a)-(e),
    (II) application of the configuration parameters to the particular network device; or
    (III) verification of the particular network device.

10. A method for identifying configuration parameters for a network device as recited in claim 1, wherein the known characteristic of the traffic data include one or a combination of data structure, data behavior, data packet size, data packet content, data packet type, or data packet generation rate.

11. A method for identifying configuration parameters for a network device as recited in claim 1, wherein traffic data is defined as control plane data, data plane data, or anomalous data.

12. A method for identifying configuration parameters for a network device as recited in claim 1, wherein the specific type of the network device is identified by one or more of a network device operating system version, a network device model, or a network device plug-in module characteristic.

13. A method for identifying configuration parameters for a network device as recited in claim 1, wherein performance is in part determined by measurements of the monitoring data.

14. A method for identifying configuration parameters for a network device as recited in claim 1, wherein monitoring data includes one or more of central processing unit (CPU) utilization, memory utilization, packet drops, effects on services, or link drops.

15. A method for identifying configuration parameters for a network device as recited in claim 1, wherein performance metrics include one or more of jitter data, latency data, packet drop data, packet reordering data, bit error data, packet loss data, fragmentation data, encapsulation data, or retransmission data.

16. A computer implemented method for ascertaining configuration parameters for routers, comprising:
    (a) defining traffic data to be applied to a router of a particular type;
    (b) setting configuration parameters of the router to a plurality of test settings;
    (c) applying the traffic data to the router when the router is in each of the plurality of test settings;
    (d) monitoring performance of the router during the application of the traffic data;
    (e) analyzing output from the router during the application of the traffic data; and
    (f) building a knowledge database from data obtained from the monitoring of the performance of the router and data obtained from the analyzing of the output;
    wherein the knowledge database is configured to be used to provide suggested configuration parameters when configuring a new router having the particular type.

17. A computer implemented method for ascertaining configuration parameters for routers as recited in claim 16, wherein the suggested configuration parameters for the new router are generated by accessing data in the knowledge database and determining an implementation environment for the new router, the implementation environment defining types of traffic to be handled by the new router.

18. A computer implemented method for ascertaining configuration parameters for routers as recited in claim 16, wherein the data obtained from the monitoring of the performance of the router and the data obtained from the analyzing of the output is empirical data obtained from actual testing of the router having the particular type.

19. A computer implemented method for ascertaining configuration parameters for routers as recited in claim 16, further comprising:
    repeating (a)-(e) for a plurality of routers of particular types, such that the knowledge database is populated with data in operation (f) for each of the plurality of routers.

20. A computer implemented method for ascertaining configuration parameters for routers as recited in claim 16, further comprising:
    defining a network configuration tool user interface for performing (a)-(f);
    using the network configuration tool user interface to apply the suggested configuration parameters to the new router; and
    using the network configuration tool user interface to run a verification and mentoring process, such that the suggested configuration parameters for the new router can be correlated against actual performance and output data of the new router.

21. A computer implemented method for ascertaining configuration parameters for routers as recited in claim 20, through the network configuration tool user interface, providing one of textual or graphical, or a combination of textual and graphical representations of the configuration settings, recommended settings, predicted results, simulation data, verification and testing data, and monitoring data.

22. A computer implemented method for ascertaining configuration parameters for routers as recited in claim 20, wherein the network configuration tool user interface functionally implements components including,
    a command processor;
    an expert system engine;
    a verification engine;
    a database command processor and database results processor for interfacing with the knowledge database; and
    a network device configuration generator for interfacing with the new router and enabling the setting of the new router and testing and verifying of the new router.

23. Computer readable media having program instructions for ascertaining configuration parameters for routers, the computer readable media comprising:
    (a) program instructions for defining traffic data to be applied to a router of a particular type;
    (b) program instructions for setting configuration parameters of the router to a plurality of test settings;
    (c) program instructions for applying the traffic data to the router when the router is in each of the plurality of test settings;
    (d) program instructions for monitoring performance of the router during the application of the traffic data;
    (e) program instructions for analyzing output from the router during the application of the traffic data; and
    (f) program instructions for building a knowledge database from data obtained from the monitoring of the performance of the router and data obtained from the analyzing of the output, the knowledge database is configured to be used to provide suggested configuration parameters when configuring a new router having the particular type.

24. The computer readable media of claim 23, further comprising:
    program instructions for repeating (a)-(e) for a plurality of routers of particular types, such that the knowledge database is populated with data in operation (f) for each of the plurality of routers.

25. Computer readable media having program instructions for identifying configuration parameters for a network device, comprising:
    (a) program instructions for generating a stream of traffic data, the traffic data having a known characteristic;
    (b) program instructions for applying the stream of traffic data to the network device, the network device having a specific type, and the network device generating an output based on the traffic data;
    (c) program instructions for monitoring performance of the network device while the traffic data is processed by the network device, the monitoring being configured to generate monitoring data for the traffic data applied to the network device having the specific type;

(d) program instructions for analyzing the output from the network device, the analyzing being performed to identify how the traffic data was handled by the network device, the analyzing being configured to generate performance metrics;

(e) program instructions for saving the monitoring data and the performance metrics to a knowledge database, wherein the knowledge database is capable of being accessed to enable configuration of another network device based on the monitoring data and performance metrics.

26. The computer readable media of claim 25, further comprising program instructions for:

(i) identifying a particular network device for configuration;

(ii) accessing the knowledge database, the knowledge database providing configuration parameters for the particular network device; and (iii) displaying predicted operational characteristics for the particular network device if the particular network device is implemented using the configuration parameters.

27. A computer implemented method for ascertaining configuration parameters for routers, comprising:

(a) defining traffic data to be applied to a router of a particular type;

(b) setting configuration parameters of the router to a plurality of test settings;

(c) applying the traffic data to the router when the router is in each of the plurality of test settings;

(d) monitoring performance of the router during the application of the traffic data;

(e) analyzing output from the router during the application of the traffic data; and (f) building a knowledge database from data obtained from the monitoring of the performance of the router and data obtained from the analyzing of the output;

wherein the knowledge database is configured to be used to provide suggested configuration parameters when configuring a new router having the particular type, and the suggested configuration parameters for the new router are generated by accessing data in the knowledge database and determining an implementation environment for the new router, the implementation environment defining types of traffic to be handled by the new router.

* * * * *